United States Patent Office 3,438,869
Patented Apr. 15, 1969

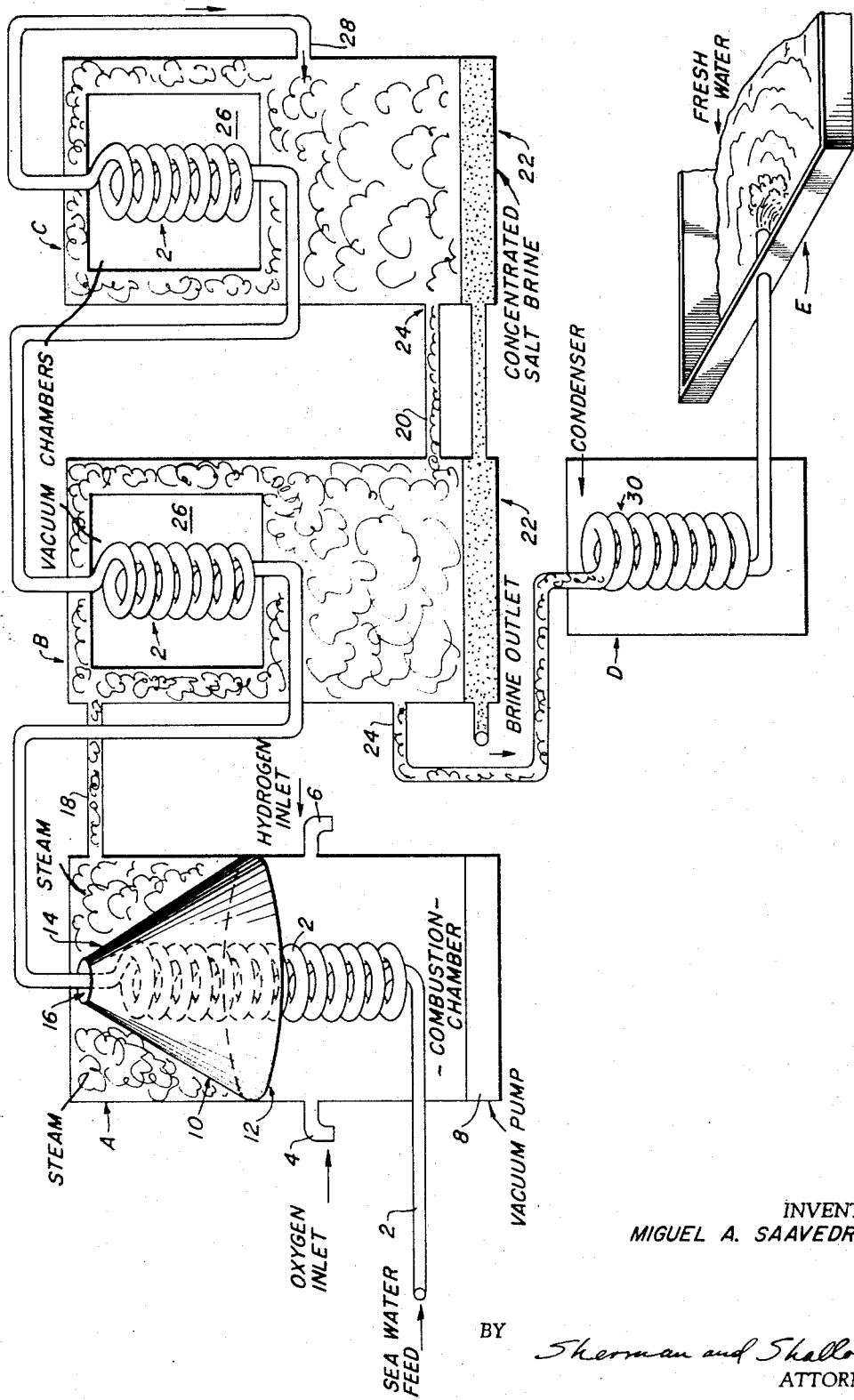

3,438,869
SYSTEM FOR CONVERSION OF SEA WATER
INTO FRESH WATER
Miguel A. Saavedra, Rimac, Peru
(Sanchez Carrion 199, Barranco, Lima, Peru)
Filed Jan. 13, 1967, Ser. No. 609,090
Int. Cl. C02b 1/06; B01d 3/10
U.S. Cl. 203—11                    10 Claims

ABSTRACT OF THE DISCLOSURE

This invention relates to a method and apparatus for producing fresh water from sea water wherein hydrogen and oxygen are burned at a pressure less than atmospheric pressure to completely vaporize a brine solution. The vapors are then passed through coils maintained in a vacuum and are then passed into a condensation chamber maintained at reduced temperature and pressure to condense liquid water containing the impurities, and separate said liquid containing impurities from the pure water vapor. The fresh water is recovered by condensation.

This invention relates to a process for converting sea water into fresh water, which may be used for industrial, agricultural and domestic uses. More specifically, the invention relates to such a process which involves the use of an evaporation and condensation process operated under controlled conditions.

The process of recovering salt from saline solutions such as sea water has been known for many years. Primitive sources used techniques which involved the use of solar energy to separate salt from sea water by allowing sea water to evaporate in pans placed in the sun. More sophisticated methods have been evolved for recovering salt from the sea water which involve evaporation in a vacuum chamber. In these processes a salt solution is fed to a heater and the heated solution is then fed to a chamber maintained under vacuum. The effect of the vacuum is to lower the boiling point of the solution and thus reduce the amount of heat which is required in the preliminary stage. The processes involving vacuum evaporation may be single or multiple-effect processes. The use of a multiple-effect evaporator is more economical in that it allows steam, which is produced from the evaporization of sea water fed to the first chamber to be used to heat additional sea water in later chambers. These processes typically are used to recover salt and other minerals carried in sea water. The recovery of fresh water from sea water has been considered uneconomical in the past. Although there is a recognized need for fresh water in many places, i.e. certain areas of the world which are located near bodies of sea water do not have sufficient supplies of fresh water for their domestic and agricultural use. This lack of fresh water retards industrial growth and retards agricultural growth in these areas. Although it is, of course, recognized that water could be recovered by evaporation as above stated, it has been felt in the past that these methods were not sufficiently economical to justify the expenditures and expenses in operating systems.

The systems which have been known suffer from many disadvantages; principally the expensive and complex equipment which is used is troublesome to operate in that minerals from the sea water which is being treated are deposited in and on the equipment . . . these effects are known as scaling and fouling. This causes the lines which convey sea water to clog, and thus reduces the capacity of the system. Furthermore, the deposit of minerals in the lines and on the equipment reduces the rate of heat transfer through the equipment. This reduction necessitates an increased supply of heat which is partially dissipated by the fouling or deposit which has occurred. Of course this inefficient use of heat is expensive, and in some cases is prohibitively expensive.

Another principal disadvantage of the prior processes resides in the manner of heating a brine solution in order to vaporize water. The prior processes have used steam to heat the brine in the belief that this was the only economical and efficient method of operation, and even this as shown above is too expensive in some cases. The use of steam from conventional generators is unsatisfactory since the temperatures used even when operating with superheated steam are insufficient to completely vaporize the brine.

The solution which is being heated becomes saturated at the equilibrium temperatures. The equilibrium temperature corresponds to the boiling point of the solution and varies according to the concentration of the solution and the pressure maintained on the solution. If a concentrated solution is allowed to boil, then part of the water will be evaporated, and a portion of the crystals will crystallize and be deposited in the carrying tube. This presents several problems since the boiling temperature of the solution increases as the solids content of the solution increase. This requires an increased amount of heat to be supplied to the tube. A further complication resides in the fact that the crystals which are deposited will clog the tubes and produce the above noted deficiencies of operation. As a heating substance contacts the carrying tubes, bubbles are formed in the liquid at the tube surface and escape by passing through the conduit thus causing boiling in the tubes. The conventional use of steam produced the above noted disadvantages since not enough heat was transferred to the solution by the use of steam.

This invention has as its principal object the provision of an economical process for recovering fresh water from sea water. Other objects include the provision of a process wherein efficient use is made of steam and heat, and wherein the problems due to fouling and scaling are substantially reduced.

It is still a further object of the present invention to provide a process and apparatus for producing fresh water by the evaporation of brines containing impurities.

Still a further object of the present invention is to produce water which is substantially free of the impurities of the original brine.

Another object of the present invention is to provide a process and apparatus for the evaporation of brines which substantially eliminates scaling of heating surfaces of the evaporator unit.

Still another object of the present invention is to provide a process and apparatus for the evaporation of brines which substantially eliminates the clogging of brine conduits with deposited salts.

A still further object of the present invention is to provide a process of the described nature which is continuous.

The present process differs substantially from these processes previously known and described above in that it provides heat to the brine which is fed into the apparatus by utilizing the heat of combustion of hydrogen and oxygen. This combustion, however, may not be conducted uncontrolled because it is well-known that hydrogen and oxygen burning uncontrolled may reach temperatures above 1000° centigrade, and as is also well-known, steel will melt at or about 1000° centigrade. Furthermore, if it continued uncontrolled the excess heat produced is lost. Thus if the hydrogen and oxygen were merely introduced into the first stage heat and allowed to burn, the chamber would melt and heat losses would be tremendous. Applicant has devised a method for utilizing this desirable source of heat by maintaining the first combustion chamber under a reduced pressure. The effect of this is to reduce the temperature of the material which is being burned. This corresponds to the well-known gas law which correlates the temperature and pressure of a given volume of gas. If the gas is maintained under substantial pressure, then the temperature increases. However, when the gas is maintained under a reduced pressure, the temperature will be decreased. Further reduction of temperature is achieved due to the reduction in volume caused by the combustion of hydrogen and oxygen. Thus 1 volume of $H_2$ combines with ½ volume of $O_2$ to yield 1 volume of $H_2O$. This is a reduction by molecular quantity of 33⅓%, thus increasing the vacuum and reducing gas temperatures. However, $O_2$ and $H_2$ are continuously fed so this effect is minor. Using these principles applicant is enabled to burn hydrogen and oxygen, and to utilize the heat from the combustion to heat brine fed to the first stage. The combustion of hydrogen and oxygen produces steam which may be further utilized to heat subsequent stages of the evaporating cycle. The chamber which is used for this combustion is initially supplied with a quantity of an inert gas to prevent explosions. This principle is also utilized by applicant to initially aid the control of the temperature of combustion of the hydrogen and oxygen. In a preferred manner of operation, the inert gas comprises nitrogen and is introduced into the system by allowing a quantity of the gas to enter the system prior to the introduction of hydrogen and oxygen. This stage is conducted prior to starting up the operation, and the quantity of nitrogen which is introduced in this manner is removed once the process is operating. A further advantage of this process involves the use of a vacuum chamber surrounded by steam and enclosing tubes carrying brine vapors to insulate brine vapors as they pass through the apparatus. Continuing in the description of applicant's process, reference is made to the drawing which is merely illustrative of the process and apparatus embodied by this invention. The drawing is in no way to be interpreted as being restrictive. In the drawing A indicates an initial boiling chamber which is provided with means 2 for conducting a brine solution therethrough. This means is shown in the drawings in the form of a coil tube. However, it is obvious that other equivalent conduits may be substituted. The initial boiling chamber further comprises means 4 to supply a first gaseous stream and means 6 to supply a second gaseous stream. At the lower portion of the initial boiling chamber means 8 is provided to reduce the pressure in said chamber. This means may be any conventional vacuum pump which is sufficient for the process conditions. At the top of the chamber an insulated frustroconical means 10 is provided which partially envelopes the conduit which carries the brine solution. This frustroconical means is provided with an opening at each end. The large end 12 is shown at approximately the center of the initial boiling chamber. However, this position may be varied if desired. The smaller end 14 of the frustroconical means is provided close to the top of the chamber, but this position may also vary. An opening 16 is provided which allows steam produced by combustion of hydrogen and oxygen to be passed from the lower portion of the initial boiling chamber to the upper portion of said chamber. Means 18 is further provided to conduct the steam from the upper portion of the chamber to a complementary boiling chamber. The complementary boiling chambers are shown as B and C in the drawing, and although two are shown in the drawing any number may be used as desired, or as is necessary in operating the process. Each complementary boiling chamber comprises means 20 to supply steam thereto, means 22 to collect a salt solution, means 24 to extract steam therefrom, and a vacuum chamber 26 through which a conduit 2 passes. Suitable means, not shown, are provided to produce a vacuum in 26. This conduit, 2, contains brine solution which is being fed from the preceding stage through the complementary boiling chamber, to the next succeeding stage. The vacuum chambers 26 enclose the coil tubes 2 shown in B and C and again any equivalent conduit may be substituted for the coiled tubes. The vacuum chamber 26 is surrounded by an atmosphere of steam, and serves to isolate the coiled conduit 2 from direct contact with the steam. In the lower portion of each complementary boiling chamber a feed means 28 supplies the vaporized brine solution, which is a mixture of water vapor containing the impurities. When this stream is fed to the chambers B and C the chambers become in effect condensation chambers since the chambers are maintained at a reduced pressure, and temperature. The stream, immediately upon entering this chamber, will separate into a water vapor portion and a liquid salt solution portion. Since the salt solution portion is heavier than the water vapor it will settle to the bottom of the tank and may be recovered therefrom. Steam which is not condensed in these complementary boiling chambers is passed to a condenser shown as D. This condenser contains conduit means 30 for passing steam through the chamber. The conduit means 30 is cooled by passing any conventional cooling medium over the surface of the conduit. Conventionally, water is used to cool these tubes. However, air or any equivalent medium is contemplated. The condensed fresh water is passed from this condenser to a storage tank E which may be of any suitable size and construction.

In the preferred form of this process, water which is produced and which is stored in the storage chamber may be utilized to prepare hydrogen and oxygen, which are used in the combustion used to heat the initial boiling chamber. This electrolysis is well-known and is conveniently carried out by adding an electrolyte to the water and then passing an electric current therethrough. While the preferred form utilizes hydrogen and oxygen obtained from the product water, this is not to be considered as limiting the invention since any source of hydrogen and oxygen may be used and is contemplated by the invention. Furthermore, the water stored in the chambers may be accumulated and used to drive turbines to produce electricity for the electrolysis, or uncondensed steam may be used to drive turbines. As is evident from the above description relative to the apparatus, the operation of the invention is as follows:

Hydrogen and oxygen are fed to the initial boiling chamber aong with an inert gas. This may be accomplished in several ways. One preferred way to introduce the inert gas into the chamber is to initially, that is before starting combustion, introduce a quantity of nitrogen into the chamber which is under a vacuum to avoid possibility of explosions due to any residual reactants. The air contains oxygen and nitrogen, and thus is a convenient source for the oxygen and the inert gas required for the process which may be separated in known ways. After the nitrogen has been admitted to the chamber, hydrogen and oxygen are admitted and combustion may be started by any convenient means such as an electric spark. Combustion occurs in the cone-shaped member. Brine from the sea is fed through the conduit means, and is heated by the combustion of the hydrogen and oxygen. Since the combustion is carried out in a chamber maintained under reduced pressure and in the presence of an inert gas, the temperature of combustion is substantially lowered. This is necessitated, because if the combustion of hydrogen and oxygen were allowed to proceed uncontrolled, the temperature of combustion would exceed the melting point of the steel used to construct the chambers. However, by controlling the pressure maintained in the chamber below atmospheric pressure, applicant has discovered that an efficient and economical heating means may be utilized which was thought in the past to be impractical or impossible. Since the combustion of hydrogen and oxygen produces steam, this steam must be allowed to escape from the chamber, along with the initially fed inert gas. Provision is made for such escape by means of the frustroconical chamber, which collects the steam and funnels it out into the upper portion of the chamber. From the upper portion the steam is passed to the complementary boiling chamber. The heated brine solution is vaporized and passes out of the initial chamber to the complementary chamber. The temperature of the combustion in the initial chamber is typically 500 to 700° centigrade, and the temperature of the steam collected in the upper portion of the initial chamber ranges from 500 to 1000° centigrade since the steam absorbs aditional heat while it is in presence of the combustion, and since the reaction is exothermic. The brine solution in the coils leaving the initial chamber is at a temperature in the range of 125–300° centgrade. The initial chamber is maintained at or about 70% vacuum, about 220 mm. of Hg. In the complementary boiling chamber steam is introduced from the initial boiling chamber at about 500–1000° centigrade, and the brine vapors are conducted through the conduits, which are shown as passing through the vacuum chamber provided inside the complementary boiling chamber. The steam in the upper portion of the complementary chamber surrounds the vacuum chamber and loses heat to the body of steam in the chamber. Since the volume and pressure in the vacuum chamber remains constant, the tempearture in 26 also remains constant. The pressure in the initial chamber may be controlled by controlling the quantity of hydrogen and oxygen fed thereto, and by controlling the rate of withdrawal of steam, the latter of course depends on the conditions of the succeeding stages. The brine vapors in conduits 2 passing through 26 neither gains nor loses heat since it passes through the vacuum chamber 26. Steam in the complementary chambers eventually reaches a condensation temperature which corresponds to the reduced pressure maintained in said chamber, which may be from 15–20° centigrade, and is collected on the bottom of the chamber as a supersaturated aqueous salt solution. Steam is further provided to the complementary boiling chambers from the succeeding boiling chamber. This steam comprises a mixture of water vapor and salt solution at about 20–25° centigrade, and the same condensation phenomenon occurs in that the salt solution precipitates from the vapor and is collected.

The second complementary boiling chamber shown in the drawing operates in substantially the same way as just described for the first complementary boiling chamber. It is noted that at this point the brine vapors which are at approximately 200 to 300° centigrade are introduced into the chamber, and the reduced pressure maintained in the chamber causes the incoming stream immediately to separate into vapors and liquid. The temperature maintained at the bottom of the second complementary chamber is maintained at from 20 to 25° centigrade. The pressure in the complementary boiling chambers is sufficient to allow precipitation of a saturated salt solution at the above named temperturcs. A salt solution at about 80% concentration is withdrawn from areas 22. The uncondensed water vapor is taken from the complementary boiling chamber to the condenser where water or air at normal temperature is passed over the conduit and absorbs the heat from the steam, causing the steam to condense. There may be provided additional condensation chambers, each at a lower temperature. The initial chamber has been described as containing nitrogen as an inert gas. This gas is preferred simply because it is conveniently available and is cheaper. Any other inert gas could be used, for example, neon, etc.

The above described process and apparatus have been described merely in illustartive terms and should not be interpreted as precluding obvious variations or substitutions.

Having described the invention in full, clear, and concise terms what is claimed is:

1. In a process for converting sea water to fresh water by the evaporation and condensation of brine, the improvement which comprises heating in indirect heat exchange the brine in a boiling chamber by burning hydrogen and oxygen in a combustion chamber under a reduced pressure of about 220 mm. Hg, combining the products of combustion with the vapor from the brine and condensing the combined vapors in a manner to maintain said reduced pressure in the boiling chamber and combustion chamber.

2. The method of claim 1 wherein the steam produced from the initial stage combustion is passed to at least one complementary chamber.

3. The method of claim 1, wherein the heated brine is passed into at least one condensing chamber maintained under reduced pressure wherein the water vapors are separated from a concentrated brine solution.

4. The method of claim 1 wherein uncondensed water vapor from the brine solution is fed to a condenser and is recovered as fresh water.

5. The method of claim 1 wherein a concentrated salt solution is recovered separately from a stream of fresh water.

6. The method of claim 1 wherein brine vapors are passing through a series of vacuum chambers.

7. The method of claim 1 wherein a stream of nitrogen is initially fed to the initial boiling chamber prior to the start of the combustion.

8. In an apparatus for producing fresh water from sea water the combination of
(A) a boiling chamber comprising means for conducting brine,
(B) a combustion chamber surrounding said boiling chamber and comprising means to supply a first gas stream, means to supply a second gas stream, a frustroconical means around at least a portion of the means for conducting brine, said frustroconical means having an opening at each end thereof, means to maintain said chamber under reduced pressure,
(C) at least one complementary chamber having means to supply steam therto, means to conduct brine vapors therethrough, means to maintain said chamber under reduced pressure, and means to extract a steam stream therefrom,
(D) at least one condenser means adapted to condense steam from said condenser,
(E) a storage means adapted to receive condensed fresh water from said condenser.

9. The apparatus of claim 8 wherein said complementary chamber includes a vacuum chamber means through which at least a portion of said means to conduct the brine vapors passes, and said vacuum chamber is surrounded by an atmosphere of steam.

10. The apparatus of claim 9 wherein said complementary chamber contains means adapted to supply a stream containing water vapor and salt, and means adapted to collect said salt solution.

References Cited

UNITED STATES PATENTS

| 2,042,713 | 6/1936 | Gray | 203—100 X |
| 2,098,629 | 11/1937 | Knowlton | 158—117.5 X |
| 2,515,013 | 7/1950 | Kruhmin | 203—100 X |
| 2,756,029 | 7/1956 | Brogdon | 203—10 X |
| 2,863,729 | 12/1958 | McDuffie et al. | 23—204 |
| 2,879,146 | 3/1959 | McElroy et al. | 23—204 X |
| 3,165,452 | 1/1965 | Williams | 203—11 |
| 3,298,931 | 1/1967 | Herbert et al. | 203—10 X |
| 3,326,778 | 6/1967 | Mock | 203—11 X |
| 3,338,797 | 8/1967 | Hermansen et al. | 202—234 |

FOREIGN PATENTS 882,715 11/1961 Great Britain.

NORMAN YUDKOFF, *Primary Examiner.*

F. E. DRUMMOND, *Assistant Examiner.*

U.S. Cl. X.R.

159—16; 202—234; 203—4, 100